US012758949B2

(12) United States Patent
Hernandez et al.

(10) Patent No.: US 12,758,949 B2
(45) Date of Patent: Oct. 13, 2026

(54) COMPOSITION OF ALUMINIUM OXIDE AND CERIUM OXIDE WITH A PARTICULAR POROSITY PROFILE

(71) Applicant: RHODIA OPERATIONS, Lyons (FR)

(72) Inventors: Julien Hernandez, Antony (FR); Oguzhan Yaglidere, Cincinnati, OH (US); Virginie Harle, Senlis (FR); Simon Ifrah, La Jarrie (FR)

(73) Assignee: RHODIA OPERATIONS, Lyons (FR)

( * ) Notice: Subject to any disclaimer, the term of this patent is extended or adjusted under 35 U.S.C. 154(b) by 28 days.

(21) Appl. No.: 18/564,390

(22) PCT Filed: May 9, 2022

(86) PCT No.: PCT/EP2022/062507
§ 371 (c)(1),
(2) Date: Nov. 27, 2023

(87) PCT Pub. No.: WO2022/248205
PCT Pub. Date: Dec. 1, 2022

(65) Prior Publication Data

US 2024/0253019 A1 Aug. 1, 2024

(30) Foreign Application Priority Data

May 28, 2021 (EP) .................................... 21315093

(51) Int. Cl.

| | |
|---|---|
| ***B01J 23/63*** | (2006.01) |
| ***B01J 35/32*** | (2024.01) |
| ***B01J 35/61*** | (2024.01) |
| ***B01J 35/63*** | (2024.01) |
| ***B01J 35/77*** | (2024.01) |
| ***B01J 37/04*** | (2006.01) |
| ***B01J 37/08*** | (2006.01) |
| ***B01J 37/34*** | (2006.01) |

(52) U.S. Cl.
CPC ............... *B01J 23/63* (2013.01); *B01J 35/32* (2024.01); *B01J 35/613* (2024.01); *B01J 35/635* (2024.01); *B01J 35/638* (2024.01); *B01J 35/77* (2024.01); *B01J 37/04* (2013.01); *B01J 37/08* (2013.01); *B01J 37/343* (2013.01); *B01J 2235/15* (2024.01)

(58) Field of Classification Search
None
See application file for complete search history.

(56) References Cited

U.S. PATENT DOCUMENTS

| | | | |
|---|---|---|---|
| 4,301,037 | A | 11/1981 | Sanchez et al. |
| 5,397,758 | A | 3/1995 | Bouruetaubertot et al. |
| 6,214,306 | B1 | 4/2001 | Aubert et al. |
| 2006/0115397 | A1 | 6/2006 | Hedouin |
| 2006/0178261 | A1 | 8/2006 | Larcher et al. |
| 2008/0187476 | A1 | 8/2008 | Larcher et al. |
| 2010/0329954 | A1 | 12/2010 | Yokota et al. |

(Continued)

FOREIGN PATENT DOCUMENTS

| | | | |
|---|---|---|---|
| EP | 0863846 | B1 | 12/2002 |
| EP | 1435338 | A1 | 7/2004 |

(Continued)

OTHER PUBLICATIONS

Piras et al. "Remarkable stabilization of transition alumina operated by ceria under reducing and redox conditions", Applied Catalysis B: Environmental 28 (2000) L77-L81 (Year: 2000).*
Machine Translation of WO 2018/115436 (Year: 2018).*
International Search Report issued for corresponding international patent application No. PCT/EP2022/062507, mailed Sep. 15, 2022 (4 pages).
Khalil K M S, et al. "Synthesis and characterization of mesoporous ceria/alumina nanocomposite materials via mixing of the corresponding ceria and alumina gel precursors," Journal of Colloid and Interface Science, Jan. 18, 2007 Academic Press, Inc, US, vol. 307,Nr:1,pp. 172-180 (9 pages).
Ozawa Hattori, et al, "Thermal stability of ceria catalyst on alumina and its surface oxygen storage capacity," Journal of alloys and compounds, Jan. 28, 2008 Elsevier Sequoia, Lausanne, CH, vol. 451,Nr:1-2,pp. 621-623 (4 pages).

(Continued)

*Primary Examiner* — Coris Fung
(74) *Attorney, Agent, or Firm* — Osha Bergman Watanabe & Burton LLP

(57) ABSTRACT

The present invention relates to a composition based on Al and Ce in the form of oxides (composition C1); or based on Al, Ce and La in the form of oxides (composition C2), with the following proportions: —the proportion of $CeO_2$ is between 3.0 wt % and 35.0 wt %; —the proportion of $La_2O_3$ (for composition $C_2$ only) is between 0.1 wt % and 6.0 wt %; —the remainder as $Al_2O_3$; exhibiting the following porosity profile: —a pore volume in the range of pores with a size of between 5 nm and 100 nm which is between 0.35 and 1.00 mL/g; and—a pore volume in the range of pores with a size of between 100 nm and 1000 nm which is less than or equal to 0.15 mL/g, these pore volumes being determined by means of the mercury porosimetry technique; and the following properties: —a mean size of the crystallites after calcination in air at 1100° C. for 5 hours (denoted D1100° C.-5 h) which is lower than 45.0 nm, preferably lower than 40.0 nm; —a mean size of the crystallites after calcination in air at 900° C. for 2 hours (denoted D900° C.-2 h) which is lower than 25.0 nm, preferably lower than 20.0 nm, even more preferably lower than 15.0 nm; and—an increase ΔD of the mean size of the crystallites lower than 30.0 nm, preferably lower than 25.0 nm, ΔD being calculated with the following formula: $\Delta D = D_{1100°\ C.-2h} - D_{900C-5h}$; the mean size of the crystallites being obtained by XRD from the diffraction peak [111] of the cubic phase corresponding to cerium oxide, generally present at 2Φ between 28.0 and 30.0.

27 Claims, No Drawings

(56) References Cited

U.S. PATENT DOCUMENTS

| | | | |
|---|---|---|---|
| 2012/0035048 | A1 | 2/2012 | Larcher et al. |
| 2012/0189517 | A1 | 7/2012 | Ifrah et al. |
| 2013/0017947 | A1 | 1/2013 | Schermanz et al. |
| 2013/0336864 | A1 | 12/2013 | Zheng et al. |
| 2014/0072492 | A1 | 3/2014 | Ifrah et al. |
| 2014/0360171 | A1 | 12/2014 | Xue et al. |
| 2017/0129781 | A1 | 5/2017 | Boualleg et al. |
| 2020/0188885 | A1 | 6/2020 | Itani et al. |
| 2021/0070623 | A1 | 3/2021 | Hernandez et al. |

FOREIGN PATENT DOCUMENTS

| | | | |
|---|---|---|---|
| EP | 1527018 | A2 | 5/2005 |
| EP | 1603667 | A2 | 12/2005 |
| EP | 1729883 | A2 | 12/2006 |
| EP | 1735242 | A1 | 12/2006 |
| EP | 2646370 | A1 | 10/2013 |
| EP | 2969191 | A1 | 1/2016 |
| EP | 3009403 | A1 | 4/2016 |
| EP | 3218307 | A1 | 9/2017 |
| EP | 3281697 | A1 | 2/2018 |
| WO | 2011006780 | A1 | 1/2011 |
| WO | 2012067654 | A1 | 5/2012 |
| WO | 2016037059 | A1 | 3/2016 |
| WO | 2018115436 | A1 | 6/2018 |

OTHER PUBLICATIONS

Written Opinion issued for corresponding international patent application No. PCT/EP2022/062507, mailed Sep. 15, 2022 (6 pages).

* cited by examiner

COMPOSITION OF ALUMINIUM OXIDE AND CERIUM OXIDE WITH A PARTICULAR POROSITY PROFILE

The present application is a U.S. national stage entry under 35 U.S.C. § 371 of International Application No. PCT/EP2022/062507 filed on May 9, 2022, which claims priority to European patent application EP 21315093.1 filed on 28 May 2021 the whole content of this application being incorporated herein by reference for all purposes.

The present invention relates to a composition of aluminium oxide, cerium oxide and optionally lanthanum oxide with a particular porosity profile that maintains a high specific surface area and a low crystallite size even after calcination at high temperatures. This composition is also characterized in that it has a high bulk density. The invention also relates to a catalytic composition comprising said composition and to the use of the composition.

TECHNICAL FIELD

Catalysts for purifying vehicle exhaust gas are now almost mandatory in order to meet pollutants regulations that are in force in most of the regions worldwide (e.g. Europe, USA, Japan, China, Korea, India, . . . ). The function of the catalyst is to remove pollutants like CO, unburnt particulate matter (e.g. soot), unburnt hydrocarbons (HC), nitrogen oxides NO and $NO_2$ (referenced as $NO_x$) that are noxious for health and for the environment.

Regulations are now becoming more and more challenging and are still expected to be stricter in the near future: see Euro 7 in Europe, SULEV 20 in the USA or China 6*b* in China. Emissions in real conditions are now also controlled like in Europe with RDE limits (Real Driving Emission) which add another challenge as the catalysts have to be efficient in a large variety of driving conditions. As a consequence, there is a requirement for having more and more efficient catalysts.

TWC Catalysts

For gasoline vehicles, the control of the emissions is achieved using the so-called 'three way' catalyst (TWC) which can simultaneously decrease the amounts of hydrocarbons, CO and NOx. Natural gas vehicles may also generally rely on TWC catalysts when the engine is running in stoechiometric mode. Yet, the same challenge as for gasoline engines is expected. In addition, the fuel to air ratio is expected to be broader which would require larger Oxygen Storage Capacity (OSC).

GPF

Gasoline vehicles are also equipped in several regions with gasoline particulate filters (GPF), the function of which is to reduce the release of particulate matter emitted in particular, but not only, for gasoline direct injection engine technologies. The GPF is based on a TWC catalyst coated on the filter and having an increased OSC to promote the additional need of oxygen to burn the particulate matter. There is therefore a general need for catalysts exhibiting an improved OSC.

DOC and DPF

For diesel engines, several catalysts can be used like the Diesel Oxidation Catalyst (DOC) to control the oxidation functions of CO, HC but also to some extent particulate matter and NOx. Diesel engines are now also in general fitted with Diesel Particulate Filters (DPF), the function of which is to filter and burn the particulate matter. So the oxidation function is key for DOC and DPF and this is important to keep oxidation function after thermal stress due to soot oxidation during DPF regeneration. NOx emissions for diesel engines are either managed by Selective Catalytic Reduction (SCR) catalyst where the NOx reduction is obtained through the reaction between NOx and $NH_3$ or by NOx trapping or adsorption on Lean NOx Trap (LNT) or Partial NOx Absorber (PNA). In both cases, oxidation function is needed to efficiently remove the NOx.

Technical Problem

The above-disclosed catalysts also require in all cases (except for SCR) the presence of at least one noble metal (e.g. Pt, Pd and Rh) aka platinum group metal (or PGM). Rh and Pd are generally more expensive than Pt, so that Pt tends to be now more commonly used. Due to the price of the PGMs, there is a general requirement to minimize their content in the catalysts. The PGMs, notably Pd and Pt, are dispersed on the surface of alumina and known to be stabilized by cerium oxide.

All the above-disclosed catalysts comprise alumina which is either used to disperse the PGM(s) (TWC, GPF, DOC, DPF, LNT, PNA) or mixed with a SCR catalyst (e.g. in general zeolite based or vanadium oxide associated with titanium oxide). All of them also comprise a ceria-based material which provides the Oxygen Storage Capacity (OSC) or assists the oxidation. Thermal stability is required for both alumina and the ceria-based material.

There is therefore a need for a thermally resistant alumina-based support which can be used for the preparation of a catalyst containing at least one PGM and which exhibits an OSC and helps stabilize the PGM(s) present in the catalyst. In the context of the present application, the term 'thermally resistant' is used to characterize a support which is able to maintain a high specific surface area and/or a small particle size after a heat treatment at high temperature. A simple and common way of characterizing the thermal stability of the support consists in measuring its specific surface area after a calcination in air at high temperature. Another way is to measure the particle size of the particles by X-ray diffraction (XRD) after the same treatment. The expression 'high temperature' depends on the nature of the catalyst used: in general the temperature of calcination is around 900° C. maximum for a diesel catalyst (like a DOC, DPF, LNT or SCR) and around 1100° C., even sometimes 1200° C., for a gasoline or natural gas catalyst (like a TWC or GPF).

In addition, the preparation of a catalyst generally involves coating of a suspension of a catalytic composition composed of inorganic materials onto a substrate or a monolith. It is of course more convenient for the preparation to use a highly concentrated suspension exhibiting a low viscosity. There is therefore also a need for a thermally resistant support which can be easily handled and used for the preparation of a highly concentrated and with low viscosity suspension.

The composition of the invention aims at solving these technical problems.

TECHNICAL BACKGROUND

WO 12067654 discloses a porous inorganic composite oxide, comprising oxides of aluminum and cerium, or oxides of aluminum and zirconium, or oxides of aluminum, cerium, and zirconium, and, optionally, one or more oxides of dopants selected from transition metals, rare earths, and mixtures thereof. There is no disclosure of the composition as in claim 1.

U.S. Pat. No. 9,611,774 B2 discloses an emission treatment system comprising: a catalyst including a catalyst composition comprising ceria-alumina particles having a ceria phase present in a weight percent of the particles in the range of about 20% to about 80% on an oxide basis, an alkaline earth metal component supported on the ceria-alumina particles, wherein the $CeO_2$ is present in the form of crystallites that are hydrothermally stable and have an average crystallite size of less than 16 nm after aging at 950° C. for 5 hours in 2% $O_2$ and 10% steam in $N_2$. There is no disclosure of the composition as in claim 1.

Brief Description of the Invention (to be Modified Later)

The invention relates to a composition as defined in any one of the below claims. This composition is according to two main embodiments:

- a composition C1 which is based on Al and Ce in the form of oxides;
- a composition C2 which is based on Al, Ce and La in the form of oxides.

with the following proportions:

- the proportion of $CeO_2$ is between 3.0 wt % and 35.0 wt %;
- the proportion of $La_2O_3$ (for composition C2 only) is between 0.1 wt % and 6.0 wt %;
- the remainder as $Al_2O_3$;

and it exhibits the following porosity profile:

- a pore volume in the range of pores with a size of between 5 nm and 100 nm which is between 0.35 and 1.00 mL/g; and
- a pore volume in the range of pores with a size of between 100 nm and 1000 nm which is less than or equal to 0.15 mL/g, these pore volumes being determined by means of the mercury porosimetry technique; and the following properties:

- a mean size of the crystallites after calcination in air at 1100° C. for 5 hours (denoted $D_{1100° C.-5h}$) which is lower than 45.0 nm, preferably lower than 40.0 nm;
- a mean size of the crystallites after calcination in air at 900° C. for 2 hours (denoted $D_{900° C.-2h}$) which is lower than 25.0 nm, preferably lower than 20.0 nm, even more preferably lower than 15.0 nm; and
- an increase ΔD of the mean size of the crystallites lower than 30.0 nm, preferably lower than 25.0 nm, ΔD being calculated with the following formula: $\Delta D = D_{1100° C.-5h} - D_{900° C.-2h}$;
- the mean size of the crystallites being obtained by XRD from the diffraction peak [111] of the cubic phase corresponding to cerium oxide, generally present at 2θ between 28.0° and 30.0°.

The invention also relates to a catalytic composition as defined in any one of the below claims. The invention relates to a process for preparing the composition as defined in the below claims.

All these objects are now defined in greater details.

DESCRIPTION OF THE INVENTION

In the present patent application, it is specified, for the continuation of the description, that, unless otherwise indicated, in the ranges of values which are given, the values at the limits are included. It is also specified that the calcinations are performed in air. "wt %" is a % by weight.

In the context of the invention, the term "particle" means an agglomerate formed from primary particles. The particle size is determined from a particle size distribution by volume obtained by means of a laser particle size analyzer. The particle size distribution is characterized by means of the parameters D10, D50 and D90. These parameters have the usual meaning in the field of measurements by laser diffraction. Dx thus denotes the value which is determined with regard to the particle size distribution by volume for which x % of the particles have a size less than or equal to this value Dx. D50 thus corresponds to the median value of the distribution. D90 corresponds to the size for which 90% of the particles have a size which is less than D90. D10 corresponds to the size for which 10% of the particles have a size which is less than D10. The measurement is generally performed on a dispersion of the particles in water.

In the context of the invention, a rare earth element means an element of the group comprising yttrium and the elements of the Periodic Table with an atomic number between 57 and 71 inclusive.

The porosity data are obtained via the mercury porosimetry technique. This technique makes it possible to define the pore volume (V) as a function of the pore diameter (D). Use may be made of a Micromeritics Autopore 9520 machine equipped with a powder penetrometer in accordance with the instructions recommended by the manufacturer. The procedure of ASTM D 4284-07 may be followed. By means of these data, it is possible to determine the pore volume in the range of pores whose size is between 5 nm and 100 nm (denoted $PV_5$-100 nm), the pore volume in the range of pores whose size is between 100 nm and 1000 nm (denoted $PV_{100}$-1000 nm) and the total pore volume (denoted TPV).

The term "specific surface area" means the BET specific surface area determined by nitrogen adsorption determined by means of the Brunauer-Emmett-Teller method. This method was described in the journal "The Journal of the American Chemical Society, 60, 309 (1938)". The recommendations of the standard ASTM D3663-03 may be followed. Unless otherwise indicated, the calcinations for a given temperature and a given duration correspond to calcinations in air at a steady temperature stage over the duration indicated.

Furthermore, it is specified that the concentrations of the solutions or the proportions in the composition of the elements Al, Ce and La (if any) are given as weight percentages of oxide equivalents. The following oxides are thus retained for the calculation of these concentrations or proportions: $Al_2O_3$ for Al, $CeO_2$ for Ce and $La_2O_3$ for La. For example, an aqueous aluminum sulfate solution with an aluminum concentration of 2.0 wt % corresponds to a solution containing 2.0% by weight of $Al_2O_3$ equivalent. Similarly, a composition with 92.0 wt % of Al and 8.0 wt % of Ce corresponds to 92.0 wt % of $Al_2O_3$ and 8.0 wt % of $CeO_2$.

The composition is based on Al and Ce in the form of oxides (composition C1) or Al, Ce and La in the form of oxides (composition C2). According to an embodiment, composition C1 consists of oxides of Ce and Al. According to another embodiment, composition C2 consists of oxides of Ce, Al and La.

First of all, the composition is defined by the proportions of its constituents. Their proportions are given by weight relative to the total weight of the composition. Thus, for compositions C1 and C2, the proportion of $CeO_2$ is between 3.0 wt % and 35.0 wt %, or between 5.0 wt % and 30.0 wt % or even between 6.0 wt % and 25.0 wt %. This proportion may be between 10.0 wt % and 25.0 wt % or even between 15.0 wt % and 25.0 wt %. The proportion of $CeO_2$ may be lower than 20.0 wt %.

For composition C2, the proportion of La is between 0.1 wt % and 6.0 wt % or even between 0.5 wt % and 6.0 wt % or even between 1.0 wt % and 5.0 wt %, this proportion being expressed as weight of $La_2O_3$ relative to the total weight of the composition.

The proportion of $Al_2O_3$ corresponds to the remainder to 100%. For composition C1, the proportion of $Al_2O_3$ is between 65.0 wt % and 97.0 wt %. For composition C2, the proportion of $Al_2O_3$ is between 59.0 wt % and 96.9 wt %. $Al_2O_3$ is the major constituent of the composition.

Then, the composition is also defined by a compromise between physico-chemical properties. The thermal stability of an alumina-based product is generally partly linked to its pore volume. By increasing the total pore volume, the thermal stability is generally increased. Yet, the increase in the total pore volume usually brings about a significant lowering of the bulk density and also an increase in the viscosity of a suspension of the product in an aqueous medium. It has been discovered that by combining specific properties such as a particular porosity and a high bulk density, it is possible to have a thermally-stable support which can be easily handled as a powder and used for the preparation of a highly-loaded and with low viscosity suspension. Thus, the composition is characterized by the following porosity profile:

- a pore volume in the range of pores with a size of between 5 nm and 100 nm which is between 0.35 and 1.00 mL/g, more particularly between 0.40 and 1.00 mL/g, even more particularly between 0.40 and 0.80 mL/g; and
- a pore volume in the range of pores with a size of between 100 nm and 1000 nm which is less than or equal to 0.15 ml/g, more particularly less than or equal to 0.10 mL/g, or even less than or equal to 0.07 mL/g.

The composition may also be defined by the following porosity profile:

- a pore volume in the range of pores with a size of between 5 nm and 100 nm which is between 0.40 and 1.00 mL/g; and
- a pore volume in the range of pores with a size of between 100 nm and 1000 nm which is less than or equal to 0.07 mL/g.

Moreover, the composition may exhibit a high specific surface area. It may have a BET specific surface area of between 80 and 300 $m^2/g$, more particularly between 90 and 200 $m^2/g$. This specific surface area may be greater than or equal to 100 $m^2/g$. This specific surface may also be between 100 and 200 $m^2/g$.

The composition moreover has high thermal stability. It may have a BET specific surface area after calcination in air at 1100° ° C. for 5 hours which is between 40 $m^2/g$ and 110 $m^2/g$, preferably between 45 $m^2/g$ and 110 $m^2/g$. This specific surface area is usually strictly lower than 82.35×($Al_2O_3$)+11.157 $m^2/g$ wherein ($Al_2O_3$) corresponds to the proportion of $Al_2O_3$ in wt % in the composition. As an example, for a proportion of $Al_2O_3$ of 80.0 wt %, the calculation leads to a value of: 82.35×80.0%+11.157=77.037 $m^2/g$.

The composition moreover has high thermal stability. It may have a BET specific surface area after calcination in air at 1200° ° C. for 5 hours of between 25 and 60 $m^2/g$.

The composition generally has a total pore volume which is generally strictly greater than 0.70 mL/g. This total pore volume may advantageously be at least 0.80 mL/g, or even at least 0.90 mL/g. This total pore volume is generally not more than 2.50 mL/g, or even no more than 2.00 mL/g.

The composition may have a bulk density of between 0.35 $g/cm^3$ and 0.90 $g/cm^3$, more particularly between 0.40 $g/cm^3$ and 0.85 $g/cm^3$. This bulk density of the powder corresponds to the weight of a certain amount of powder relative to the volume occupied by this powder:

bulk density in g/mL=(mass of the powder (g))/(volume of the powder (mL))

This bulk density may be determined by the method described below. Firstly, the volume of a measuring cylinder of about 25 mL with no spout is determined precisely. To do this, the empty measuring cylinder is weighed (tare T). Distilled water is then poured into the measuring cylinder up to the rim but without exceeding the rim (no meniscus). The measuring cylinder filled with distilled water is weighed (M). The mass of water contained in the measuring cylinder is thus:

$$E = M - T$$

The calibrated volume of the measuring cylinder is equal to $V_{measuring\ cylinder}$=E/(density of water at the measurement temperature). The density of the water is, for example, equal to 0.99983 g/mL for a measurement temperature of 20° C.

The composition in the form of powder is carefully poured into the empty and dry measuring cylinder using a funnel until the rim of the cylinder is reached. The excess powder is levelled off using a spatula. The powder must not be compacted or tamped down during the filling. The measuring cylinder containing the powder is then weighed. bulk density (g/mL)=(mass of the measuring cylinder containing the alumina powder–

$$\text{Tare } T\ (g))/(V_{measuring\ cylinder}\ (\text{mL}))$$

The composition may have a D50 of between 2.0 μm and 80.0 μm. It may have a D90 of less than or equal to 150.0 μm, more particularly less than or equal to 100.0 μm. It may have a D10 of greater than or equal to 1.0 μm.

It will also be noted that the composition is crystalline. This may be demonstrated by means of an X-ray diffractogram. The composition comprises a crystalline phase based on alumina. Such phase may be a delta phase, a theta phase, a gamma phase or a mixture of at least two of these phases.

Composition C2 preferably does not comprise any XRD diffraction pattern of a phase containing lanthanum, in particular any of the following phases $LaAlO_3$ or $LaAl_{11}O_{18}$. These last two phases may be identified by the following respective references of the International Centre for Diffraction Data: ICDD 01-070-4111 and ICDD 00-033-0699.

The composition also comprises a crystalline phase based on cerium oxide. This phase may correspond to pure $CeO_2$ or to $CeO_2$ containing lanthanum. This phase exhibits a diffraction line 2θ between 28.0° and 30.0°.

From the diffraction peak [111] of the cubic phase corresponding to cerium oxide, which is present at 2θ between 28.0° and 30.0°, it is possible to determine the mean size of the crystallites. The composition exhibits indeed:

- a mean size of the crystallites after calcination in air at 1100° C. for 5 hours (denoted D1100° C.-5 h) which is lower than 45.0 nm, preferably lower than 40.0 nm;
- a mean size of the crystallites after calcination in air at 900° C. for 2 hours (denoted D900° C.-2 h) which is lower than 25.0 nm, preferably lower than 20.0 nm, even more preferably lower than 15.0 nm; and an increase $\Delta D$ of the mean size of the crystallites lower than 30.0 nm, preferably lower than 25.0 nm, $\Delta D$ being calculated with the following formula: $\Delta D = D_{1100° C.-5h} - D_{900° C.-2h}$.

The mean size $D_{1100° C.-5h}$ is generally at least 8.0 nm. Likewise, the mean size $D_{900° C.-2h}$ is generally at least 5.0 nm.

The mean size of the crystallites D is measured by X-ray diffraction. It corresponds to the size of the coherent domain calculated from the width of the diffraction line 2θ between 28.0° and 30.0° and using the Scherrer equation. According to the Scherrer equation, D is given by formula (I):

$$D = \frac{k\lambda}{B\cos\theta} \tag{I}$$

D: mean crystallite size;

k: shape factor equal to 0.9;

λ (lambda): wavelength of the incident beam (for a CuKα1 source, λ=1.5406 Angstrom);

B: line broadening measured at half the maximum intensity (radian);

θ: Bragg angle (radian)

One usually takes into account the broadening due to the instrument to determine B.

In formula (II), the broadening due to the instrument is $B_{instr}$ and $$D = \frac{k\lambda}{(B_{obs} - B_{instr})\cos\theta} \tag{II}$$

D: mean crystallite size;

k: shape factor equal to 0.9;

λ (lambda): wavelength of the incident beam (for a CuKα1 source, λ=1.5406 Angstrom);

$B_{obs}$: full width at half maximum of the diffraction peak (radian);

$B_{instr}$: instrumental line broadening (radian);

θ: Bragg angle (radian).

$B_{instr}$ depends on the instrument used and on the 2θ (theta) angle.

The composition is generally in the form of powder. As a powder, the composition may be characterized according to two specific embodiments:

- according to a first embodiment, the composition has a D50 of between 2.0 and 15.0 μm, or even between 4.0 and 12.0 μm. The D90 may be between 20.0 μm and 60.0 μm, or even between 25.0 μm and 50.0 μm. According to the first embodiment, when the D50 is between 2.0 and 15.0 μm, the bulk density is between 0.35 and 0.55 g/cm$^3$;
- according to a second embodiment, the composition has a D50 of between 15.0 and 80.0 μm, or even between 20.0 and 60.0 μm. The D90 may be between 40.0 μm and 150.0 μm, or even between 50.0 μm and 100.0 μm. According to the second embodiment, when the D50 is between 15.0 and 80.0 μm, the bulk density may be between 0.40 and 0.90 g/cm$^3$.

D50 and D90 are determined by means of a laser particle size analyzer from a particle size distribution by volume, the measurement being performed on a dispersion of the particles in water.

D10 is usually at least 0.5 μm.

The composition may also comprise some residual components. The composition may comprise residual sodium. The content of residual sodium may be less than or equal to 0.50% by weight, or even less than or equal to 0.15% by weight. The sodium content may be greater than or equal to 50 ppm. This content may be between 50 and 900 ppm, or even between 100 and 800 ppm. This content is expressed as weight of $Na_2O$ relative to the total weight of the composition. Thus, for a composition having a residual sodium content of 0.15%, it is considered that there is, per 100 g of mixed oxide, 0.15 g of $Na_2O$. The method for determining the sodium content within this concentration range is known to those skilled in the art. For example, the composition can be digested in acidic conditions, the digestion being optionally assisted by microwaves and once the composition is fully dissolved, the acidic solution is titrated by inductively coupled plasma spectroscopy technique.

The composition may comprise residual sulfate. The content of residual sulfate may be less than or equal to 1.00 wt %, or even less than or equal to 0.50 wt %, or else even less than or equal to 0.25 wt %. The sulfate content may be greater than or equal to 50 ppm. This content may be between 100 and 2500 ppm, or even between 400 and 1000 ppm. This content is expressed as weight of sulfate relative to the total weight of the composition. Thus, for a composition having a residual sulfate content of 0.50 wt %, it is considered that there is, per 100 g of the composition, 0.50 g of $SO_4$. The method for determining the sulfate content within this concentration range is known to those skilled For instance, the same method as for the sodium titration can be applied.

The composition may contain impurities other than sodium and sulfate, for example impurities based on silicium, titanium or iron. The proportion of each impurity is generally less than 0.10 wt %, or even less than 0.05 wt %.

Use of the Composition

The composition of the invention may be used in the field of catalysis and in particular in the preparation of a catalyst used to purify vehicle exhaust gas. The composition according to the invention may be used in the preparation of a catalytic converter, the role of which is to treat motor vehicle exhaust gases. The catalytic converter comprises at least one catalytically active coating layer prepared from the composition and deposited on a support. The role of the catalytic converter is to convert, by chemical reactions, certain pollutants of the exhaust gas, in particular carbon monoxide, unburnt hydrocarbons and nitrogen oxides, into products which are less harmful to the environment.

The composition of the invention may also be used for the preparation of a catalytic composition. A catalytic composition generally comprises:

(i) the composition of the invention; and
(ii) optionally at least one inorganic material other than the composition of the invention; and/or
(iii) optionally at least one platinum group metal (PGM).

According to an embodiment, the catalytic composition:

(i) the composition of the invention; and
(ii) at least one inorganic material other than the composition of the invention; and
(iii) optionally at least one platinum group metal (PGM).

According to another embodiment, the catalytic composition:

(i) the composition of the invention; and
(ii) at least one inorganic material other than the composition of the invention; and
(iii) at least one platinum group metal (PGM).

The inorganic material other than the composition of the invention is selected in the group consisting of zeolites; alumina-based materials; ceria-based materials; zirconia-based materials; mixed oxides comprising oxides of cerium and zirconium; mixed oxides comprising oxides of aluminium, cerium and zirconium; and combinations thereof.

The inorganic material may be a zeolite. The zeolite may be selected in the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI and combinations thereof. The zeolite may be ion-exchanged with at least one catalytic metal, such as Cu, Fe, Ce and combinations thereof.

The inorganic material may be a ceria-based material. The ceria-based material may be selected in the group consisting of cerium oxide; mixed oxides of cerium and at least one rare earth element other than cerium and composite oxides of cerium and at least one alkaline earth element. The proportion of the rare earth element or of the alkaline earth element is usually between 1.0 wt % and 30.0 wt %, this proportion being expressed as oxides relative to the ceria-based material as a whole. Examples of ceria-based materials may be found in the following references: EP 1435338 B1, U.S. Pat. No. 8,435,919, EP 3218307 B1, EP 1435338.

The inorganic material may be an alumina-based material. The alumina-based material may be selected in the group consisting of alumina; alumina stabilized by at least one oxide of an element selected in the group consisting of silicon, zirconium, rare earth metals, alkaline earth metals; aluminium hydrate; and combinations thereof. The alumina-based material may more particularly be an alumina or an alumina stabilized by lanthanum oxide. The proportion of the stabilizing element is usually between 1.0 wt % and 10.0 wt %, this proportion being expressed as oxides relative to the alumina-based material as a whole. Examples of alumina-based materials may be found in the following references: US 2017/0129781, U.S. Pat. No. 4,301,037.

The inorganic material may be a zirconia-based material. The zirconia-based material may be selected in the group consisting of zirconia and zirconia stabilized by at least one oxide of an element selected in the group consisting of yttrium, lanthanum, praseodymium, cerium and combinations thereof. Examples of zirconia-based materials may be found in the following references: EP 1735242 B1, EP 1729883 B1 and EP 2646370 B1.

The inorganic material may be a mixed oxide comprising oxides of cerium and zirconium. The mixed oxide comprising oxides of cerium and zirconium may be selected in the group of mixed oxides of cerium and zirconium and mixed oxides of cerium, zirconium and at least one rare earth element other than cerium. Examples of mixed oxides comprising oxides of cerium and zirconium may be found in the following references: EP 1527018 B1, EP 3009403 B1, EP 0863846 B1, EP 2454196 B1, EP 1603667 B1, WO 2016037059.

The inorganic material may be mixed oxide comprising oxides of aluminium, cerium and zirconium. The mixed oxide comprising oxides of aluminium, cerium and zirconium may be selected in the group of mixed oxides of aluminium, cerium and zirconium and mixed oxides of aluminium, cerium, zirconium and at least one rare earth element other than cerium. Examples of such mixed oxides may be found in the following references: WO 2018/115436, US 2013/0336864, US 2013/0017947.

The platinum group metal (PGM) is an element selected in the group of group VIII of the periodic table. The platinum group metal may more particularly be and is usually selected in the group consisting of Pt, Pd, Rh and combinations thereof.

A catalytic composition is prepared by the usual techniques in the field known to the skilled person. For example, a process of preparation of said catalytic composition comprises the following steps: (a) preparing a suspension in an aqueous medium containing the composition of the invention and the inorganic material other than the composition of the invention, (b) wet-milling of the suspension of step (a), (c) optionally bringing into contact the suspension with an aqueous solution of at least one PGM, (d) coating the obtained suspension onto a support e.g. a monolith or a filter, (e) drying and/or calcining in air. As an alternative, the process does not comprise step (c) and the PGM is introduced onto the composition of the invention before step (a) by any known technique such as incipient wetness impregnation method.

An example of preparation of a catalytic composition according to this process corresponds to example 1 of EP 2969191: the composition of the invention is impregnated with a Pd nitrate solution using standard incipient wetness techniques. The Pd impregnated powder is placed into deionized water, and a Pt nitrate solution is added. After reducing the pH to 4 by addition of acid, the slurry is milled and the milled slurry is dried and calcined at 450° C. for 2 hours in air. Another example of a preparation is provided in example 1 of EP 3281697.

The catalytic composition may also comprise at least one element selected in the group consisting of the alkali metals and the alkaline earth metals. This element is usually in the form of an oxide. The element may be an alkali metal such as sodium or potassium. The element may also be an alkaline earth metal such as magnesium, barium or strontium. The element may be present in different forms in the catalytic composition:

- according to an embodiment, it is present on the composition of the invention, e.g. for instance impregnated on it. An example of process of impregnation comprises the following steps: (a) bringing into contact the composition of the invention and a salt of an alkali metal or an alkaline earth metal, (b) drying the mixture and (c) optionally calcining in air the dried mixture. An example of preparation corresponds to example 1 of U.S. Pat. No. 9,611,774 B2: the composition of the invention is impregnated with a barium acetate solution, the mixture is dried at 110° C. and calcined at 720° C. for 2 hours;
- according to another embodiment, it may be present in the inorganic material other than the composition of the invention. Typically it is present in the alumina-based material or in the ceria-based material.

As examples and without limitations, below are provided examples of catalytic compositions:

- catalytic composition which may be used as a TWC or GPF catalyst comprising the composition of the invention; at least one mixed oxide of cerium, zirconium and at least one rare earth element; at least one alumina; at least one PGM e.g. a combination platinum+ palladium+ rhodium;
- catalytic composition which may be used as a TWC or GPF catalyst comprising the composition of the invention; at least one mixed oxide of aluminium, cerium, zirconium and at least one rare earth element other than cerium; at least one alumina; at least one PGM e.g. a combination palladium+ rhodium;

catalytic composition which may be used as a TWC or GPF catalyst comprising the composition of the invention; at least one mixed oxide of cerium, zirconium and at least one rare earth element; at least one PGM e.g. a combination palladium+ rhodium;

catalytic composition which may be used as a DOC comprising the composition of the invention; at least one alumina; at least one zeolite; a least one PGM e.g. a combination platinum+ palladium;

catalytic composition which may be used as a DOC comprising the composition of the invention; at least one zeolite; at least one PGM e.g. a combination platinum+ palladium;

catalytic composition which may be used as a DPF comprising the composition of the invention; at least one alumina; at least one PGM e.g. platinum;

catalytic composition which may be used as a SCR comprising the composition of the invention; at least one zeolite containing copper oxide or iron oxide; boehmite;

catalytic composition which may be used as an LNT comprising the composition of the invention; at least one composite oxide of cerium and barium; at least one alumina; at least one PGM e.g. a combination platinum+ palladium;

catalytic composition which may be used as an LNT comprising the composition of the invention; at least one composite oxide of cerium and barium; at least one PGM e.g. a combination platinum+ palladium.

Preparation Process

The invention also relates to a process for preparing the composition of the invention comprising the following steps:

(a) the following are introduced with stirring into a tank initially containing an acidic aqueous solution with a pH of between 0.5 and 4.0, or even between 0.5 and 3.5:

(a1)—either an aqueous solution of sodium aluminate until a pH of the reaction mixture of between 8.0 and 10.0, or even between 8.5 and 9.5, is obtained;

(a2)—or, simultaneously, (i) an aqueous solution of aluminum sulfate and (ii) an aqueous solution of sodium aluminate until a pH of the reaction mixture of between 6.5 and 10.0, or even between 7.0 and 8.0 or between 8.5 and 9.5, is obtained; so that, at the end of step (a), the aluminum concentration of the reaction mixture is between 0.50% and 3.0% by weight;

(b) followed by simultaneous introduction of an aqueous solution of aluminum sulfate and an aqueous solution of sodium aluminate, the rates of introduction of which are such that the mean pH of the reaction mixture is maintained within the pH range targeted in step (a);

the temperature of the reaction mixture for steps (a) and (b) being at least 60° C.;

(c) at the end of step (b), the pH of the reaction mixture is optionally adjusted to a value of between 7.5 and 10.5, or even between 8.0 and 9.0 or between 9.0 and 10.0;

(d) the reaction mixture is then filtered and the solid recovered is washed;

(e) a dispersion in water of the solid recovered on conclusion of step (d) undergoes a mechanical or ultrasonication treatment so as to reduce the particle size of the dispersion;

(f) at least one salt of cerium is added to the dispersion obtained at the end of step (e);

(g) the dispersion obtained on conclusion of step (f) is dried;

(h) the solid obtained from step (g) is then calcined in air characterized in that:

for composition C1 and C2, at least one salt of cerium is added in step (f) and may also be added before step (d), the proportion $\alpha$ of the salt of cerium added in step (f) being between 20% and 100%, preferably between 50% and 100%, a being calculated by the following formula: $\alpha$=amount added in step (f)/total amount of cerium added×100; and for composition C2, at least one salt of lanthanum is added before step (d) or at step (f).

step (a)

In step (a), the following are introduced with stirring into a tank initially containing an acidic aqueous solution with a pH of between 0.5 and 4.0, or even between 0.5 and 3.5:

(a1)—either an aqueous solution of sodium aluminate until a pH of the reaction mixture of between 8.0 and 10.0, or even between 8.5 and 9.5, is obtained;

(a2)—or, simultaneously, (i) an aqueous solution of aluminum sulfate and (ii) an aqueous solution of sodium aluminate until a pH of the reaction mixture of between 6.5 and 10.0, or even between 7.0 and 8.0 or between 8.5 and 9.5, is obtained;

so that, at the end of step (a), the aluminum concentration of the reaction mixture is between 0.50% and 3.0% by weight.

The acidic aqueous solution initially contained in the tank has a pH of between 0.5 and 4.0, or even between 0.5 and 3.5. This solution may consist of a dilute aqueous solution of a mineral acid, for instance sulfuric acid, hydrochloric acid or nitric acid.

The acidic aqueous solution may also consist of an aqueous solution of an acidic aluminum salt such as aluminum nitrate, chloride or sulfate. Preferably, the aluminum concentration of this solution is between 0.01 wt % and 2.0 wt %, or even between 0.01 wt % and 1.0 wt %, or else even between 0.10 wt % and 1.0 wt %. Preferably, the acidic aqueous solution is an aqueous solution of aluminum sulfate. This solution is prepared by dissolving aluminum sulfate in water or by diluting preformed aqueous solution(s) in water. The pH of the aqueous solution developed by the presence of the aluminum sulfate is generally between 0.5 and 4.0, or even between 0.5 and 3.5.

Step (a) is performed according to two embodiments (a1) or (a2). According to embodiment (a1), an aqueous solution of sodium aluminate is introduced with stirring. According to embodiment (a2), (i) an aqueous solution of aluminum sulfate and (ii) an aqueous solution of sodium aluminate are introduced simultaneously with stirring.

Preferably, the aqueous solution of sodium aluminate does not contain any precipitated alumina. The sodium aluminate preferably has an $Na_2O/Al_2O_3$ ratio of greater than or equal to 1.20, for example between 1.20 and 1.40.

The aqueous solution of sodium aluminate may have an aluminum concentration of between 15.0 wt % and 35.0 wt %, more particularly between 15.0 wt % and 30.0 wt %, or even between 20.0 wt % and 30.0 wt %. The aqueous solution of aluminum sulfate may have an aluminum concentration of between 1.0 wt % and 15.0 wt %, more particularly between 5.0 wt % and 10.0 wt %.

On conclusion of step (a), the aluminum concentration of the reaction mixture is between 0.50 wt % and 3.0 wt %.

In this step (a), the time of introduction of the solution(s) is generally between 2 min and 30 min.

In step (a), the introduction of the aqueous solution of sodium aluminate has the effect of increasing the pH of the reaction mixture.

In particular for embodiment (a1), the aqueous solution of sodium aluminate may be introduced directly into the reaction medium, for example via at least one introduction cannula. In particular for embodiment (a2), the two solutions may be introduced directly into the reaction medium, for example via at least two introduction cannulas. For these two embodiments (a1) and (a2), the solution(s) are preferably introduced into a well-stirred zone of the reactor, for example into a zone close to the stirring rotor, so as to obtain efficient mixing of the solution(s) introduced into the reaction mixture. For embodiment (a2), when the solutions are introduced via at least two introduction cannulas, the points of injection via which the two solutions are introduced into the reaction mixture are distributed so that the solutions become efficiently diluted in said mixture. Thus, for example, two cannulas may be arranged in the tank so that the points of injection of the solutions into the reaction mixture are diametrically opposed.

step (b)

In step (b), an aqueous solution of aluminum sulfate and an aqueous solution of sodium aluminate are introduced simultaneously, the rates of introduction of which solutions are regulated so as to maintain a mean pH of the reaction mixture within the pH range targeted in step (a). Thus, the target value of the mean pH is between:

- 8.0 and 10.0, or even between 8.5 and 9.5, for the case where embodiment (a1) was followed in step (a); or
- 6.5 and 10.0, or even between 7.0 and 8.0 or between 8.5 and 9.5, for the case where embodiment (a2) was followed in step (a).

The term "mean pH" means the arithmetic mean of the pH values of the reaction mixture which are recorded continuously during step (b).

Preferably, the aqueous solution of sodium aluminate is introduced at the same time as the aqueous solution of aluminum sulfate at a flow rate that is regulated so that the mean pH of the reaction mixture is equal to the target value. The flow rate of the aqueous solution of sodium aluminate which serves to regulate the pH may fluctuate in the course of step (b).

The time of introduction of the two solutions may be between 10 minutes and 2 hours, or even between 30 minutes and 90 minutes. The flow rate of introduction of the solution or of the two solutions may be constant.

It is necessary for the temperature of the reaction mixture for steps (a) and (b) to be at least 60° C. This temperature may be between 60° C. and 95° C. To do this, the solution initially contained in the tank in step (a) may have been preheated before the start of introduction of the solution(s). The solutions that are introduced into the tank in steps (a) and (b) may also be preheated beforehand.

step (c)

In step (c), the pH of the reaction mixture is optionally adjusted to a value of between 7.5 and 10.5, or even between 8.0 and 9.0 or between 9.0 and 10.0, by adding a basic or acidic aqueous solution.

The acidic aqueous solution that may be used for adjusting the pH may consist of an aqueous solution of a mineral acid, for instance sulfuric acid, hydrochloric acid or nitric acid. The acidic aqueous solution may also consist of an aqueous solution of an acidic aluminum salt such as aluminum nitrate, chloride or sulfate.

The basic aqueous solution that may be used for adjusting the pH may consist of an aqueous solution of a mineral base, for instance sodium hydroxide, potassium hydroxide or aqueous ammonia. The basic aqueous solution may also consist of an aqueous solution of a basic aluminum salt such as sodium aluminate. An aqueous solution of sodium aluminate is preferably used.

Preferably, the pH is adjusted by stopping:

- (c1)—the introduction of the aqueous sulfate solution and the introduction of the aqueous solution of sodium aluminate is continued until the target pH is reached; or alternatively
- (c2)—the introduction of the aqueous solution of sodium aluminate and the introduction of the aqueous solution of aluminum sulfate is continued until the target pH is reached.

According to one embodiment, the introduction of the aqueous solution of aluminum sulfate is stopped and the introduction of the aqueous solution of sodium aluminate is continued until a target pH of between 8.0 and 10.5 and preferably between 9.0 and 10.0 is reached. The duration of step (c) may be variable. This duration may be between 5 min and 30 min.

step (d)

In step (d), the reaction mixture is filtered. The reaction mixture is generally in the form of a slurry. The solid recovered on the filter may be washed with water. To do this, use may be made of hot water having a temperature of at least 50° C.

step (e)

In step (e), a dispersion in water of the solid recovered on conclusion of step (d) undergoes a mechanical or ultrasonication treatment so as to reduce the particle size of the dispersion. The pH of this dispersion before milling may optionally be adjusted to between 5.0 and 8.0. A nitric acid solution may be used, for example, to do this.

The D50 of the particles of the dispersion before the mechanical or ultrasonication treatment is generally between 10.0 μm and 40.0 μm, or even between 10.0 μm and 30.0 μm. The D50 of the particles of the solid after the mechanical or ultrasonication treatment is preferably between 1.0 μm and 15.0 μm, or even between 2.0 μm and 10.0 μm.

The mechanical treatment consists in applying a mechanical stress or shear forces to the dispersion so as to fractionate the particles. The mechanical treatment may be performed, for example, by means of a ball mill, a high-pressure homogenizer or a milling system comprising a rotor and a stator. On a laboratory scale, use may be made of a Microcer or Labstar Zeta ball mill, both of which are sold by the company Netzsch (for further details, see: https://www.netzsch-grinding.com/fr/produits-solutions/broyage-humide/broyeurs-de-laboratoire-serie-mini/). A milling system as described in the examples may be used. In the case of a ball mill, use may be made, for example, of yttrium-stabilized zirconium oxide beads. ZetaBeads Plus 0.2 mm balls may be used, for example.

The ultrasonication treatment consists, for its part, in applying a sound wave to the dispersion. The sound wave which propagates through the liquid medium induces cavitation which enables the particles to be fractionated. On a laboratory scale, use may be made of an ultrasonication system with a Sonics Vibracell VC750 generator equipped with a 13 mm probe. The duration and the power applied are adjusted so as to achieve the targeted D50.

The mechanical or ultrasonication treatment may be performed in batch mode or continuously.

step (f)

In step (f), at least one salt of cerium is added to the dispersion obtained at the end of step (e). It may also be envisaged to add in this step an aqueous ammonia solution to raise the pH, preferably to a value of between 5.0 and 8.0. The salt of cerium may be selected in the group consisting of cerium chloride, cerium acetate and cerium nitrate. The salt of cerium is preferably a salt of Ce (III).

The salt of cerium may also be added before step (d), for instance in step (a), e.g. in the solution containing aluminium sulfate. The proportion α of the salt of cerium added in step (f) is between 20% and 100%, preferably between 50% and 100%, a being calculated by the following formula: α=amount added in step (f)/total amount of cerium added×100. Preferably, α=100% which means that the salt of cerium is added only in step (f) to the dispersion obtained at the end of step (e).

For composition C2, at least one salt of lanthanum may also be added before step (d) or at step (f) to the dispersion obtained at the end of step (e).

The salts of cerium and of lanthanum are conveniently introduced in the form of aqueous solutions.

step (g)

In step (g), the dispersion from step (f) is dried, preferably by spraying.

Spray-drying has the advantage of giving particles with a controlled particle size distribution. This drying method also offers good production efficiency. It consists in spraying the dispersion as a mist of droplets in a stream of hot gas (for example a stream of hot air) circulating in a chamber. The quality of the spraying controls the size distribution of the droplets and, consequently, the size distribution of the dried particles. The spraying may be performed using any sprayer known per se. Two main types of spraying devices exist: turbines and nozzles. Regarding the various spraying techniques that may be implemented in the present process, reference may be made notably to the standard manual by Masters entitled "Spray-Drying" (second edition, 1976, published by George Godwin, London). The operating parameters which a person skilled in the art can modify are notably the following: the flow rate and the temperature of the dispersion entering the sprayer; the flow rate, pressure, humidity and temperature of the hot gas. The inlet temperature of the gas is generally between 100° C. and 800° C. The outlet temperature of the gas is generally between 80° C. and 150° C.

The D50 of the powder recovered on conclusion of step (g) is generally between 2.0 μm and 80.0 μm. This size is linked to the size distribution of the droplets leaving the sprayer. The evaporation capacity of the atomizer is generally linked to the size of the chamber. Thus, on a laboratory scale (Büchi B 290), the D50 may be between 2.0 and 15.0 μm. On a larger scale, the D50 may be between 15.0 and 80.0 μm.

step (h)

In step (h), the solid obtained from step (g) is calcined in air. The calcination aims at converting the ingredients added in the previous steps into oxides and at developing the crystallinity of the composition. The calcination temperature is generally between 500° C. and 1000° C., more particularly between 800° C. and 1000° C. The calcination time is generally between 1 and 10 hours.

The balance between the calcination temperature and the calcination time should be adapted to convert the ingredients into oxides and to develop the crystallinity of the composition having in mind that too high a calcination temperature affects both the specific surface area and the mean crystallite size. The calcination conditions given in example 1 may be used as they offer such a good balance.

It may be envisaged to perform the two steps (g) and (h) in the same equipment in which the dispersion obtained from step (f) undergoes a heat treatment for performing both drying and calcination.

Preferably, the mixed oxide that is recovered on conclusion of step (h) (i.e. at the end of the calcination) has a D50 generally between 2.0 μm and 80.0 μm. It generally has a D90 of less than or equal to 150.0 μm, more particularly less than or equal to 100.0 μm.

According to a first embodiment, at the end of step (h), the D50 may be between 2.0 and 15.0 μm, or even between 4.0 and 12.0 μm. The D90 may be between 20.0 μm and 60.0 μm, or even between 25.0 μm and 50.0 μm. This embodiment may rather be performed when step (f) is performed on a laboratory scale using, for example, a Büchi B 290 atomizer.

According to a second embodiment, at the end of step (h), the D50 may be between 15.0 and 80.0 μm, or even between 20.0 and 60.0 μm. The D90 may be between 40.0 μm and 150.0 μm, or even between 50.0 μm and 100.0 μm. This embodiment may rather be performed when step (f) is performed on a larger scale.

The process may also comprise a final step via which the solid obtained in the preceding step undergoes milling so as to adjust the particle size of the solid. Use may be made of a knife mill, an air jet mill, a hammer mill or a ball mill. Preferably, the milled product has a D50 generally between 2.0 μm and 15.0 μm. The D90 may be between 20.0 μm and 60.0 μm, or even between 25.0 μm and 50.0 μm.

The composition of the invention is in the form of a powder.

Further details for the preparation of the composition of the invention will be found in the following illustrative examples.

EXAMPLES

Measurement of the Specific Surface Area:

For the continuation of the description, the term "specific surface area" means the BET specific surface area determined by nitrogen adsorption in accordance with the standard ASTM D 3663-03 established from the Brunauer-Emmett-Teller method described in the journal "The Journal of the American Chemical Society, 60, 309 (1938)". The specific surface area is determined automatically using, for example, a Tristar II 3020 machine from Micromeritics in accordance with the instructions recommended by the manufacturer. The samples are pretreated at 250° C. for 90 min under vacuum (for example to reach a pressure of 50 mmHg). This treatment makes it possible to remove the physisorbed volatile species at the surface (for instance $H_2O$, etc.).

Measurement of the Porosity with Mercury (Hg Porosimetry)

The measurement is performed using a mercury porosimetry machine. In the present case, use was made of a Micromeritics Autopore IV 9520 machine equipped with a powder penetrometer, in accordance with the instructions recommended by the manufacturer. The following parameters were used: penetrometer used: 3.2 ml (Micromeritics reference: penetrometer type No. 8); capillary volume: 0.412 ml; max. pressure ("head pressure"): 4.68 psi; contact angle: 130°; surface tension of the mercury: 485 dynes/cm; density of the mercury: 13.5335 g/ml. At the start of the measurement, a vacuum of 50 mmHg is applied to the sample for 5 min. The equilibrium times are as follows: low pressure range (1.3-30 psi): 20 s-high pressure range (30-60 000 psi): 20 s. Prior to the measurement, the samples are treated at 200° C. for 120 min to remove the physisorbed volatile species at the surface (for instance $H_2O$, etc). From this measurement, the pore volumes may be deduced.

X-ray diffraction: use was made of an x-ray diffractometer X'Pert Pro with a copper source (CuKα1, λ=1.5406 Angstrom).

Measurement of the Particle Size (D10, D50, D90)

To perform the particle size measurements, use is made of a Malvern Mastersizer 2000 or 3000 laser diffraction particle size analyzer (further details regarding this machine are given here: https://www.malvernpanalytical.com/fr/products/product-range/mastersizer-range/mastersizer-3000). The laser diffraction technique used consists in measuring the intensity of the light scattered during the passage of a laser beam through a sample of dispersed particles. The laser beam passes through the sample and the intensity of the scattered light is measured as a function of the angle. The diffracted intensities are then analyzed to calculate the particle size using the Mie scattering theory. The measurement makes it possible to obtain a volume-based size distribution, from which the parameters D10, D50 and D90 are deduced.

Example 1: Preparation of a Composition of Aluminum Oxide and Cerium Oxide According to the Invention (80 wt % $Al_2O_3$-20 wt % $CeO_2$) According to Embodiment (a1) and with α=100%

157 kg of deionized water are introduced into a stirred reactor and heated to 85° C. This temperature is maintained throughout steps (a) to (c). 13.8 kg of an aluminum sulfate solution with a concentration of 8.3 wt % of alumina ($Al_2O_3$) are introduced at a flow rate of 920 g of solution/min via an introduction cannula close to the stirring rotor. At the end of the introduction, the pH in the reactor is close to 2.6 and the aluminum concentration is 0.7% by weight of alumina ($Al_2O_3$). The introduction of the aluminum sulfate solution is then stopped.

step (a): a sodium aluminate solution with a concentration of 24.9 wt % of alumina ($Al_2O_3$) and a $Na_2O/Al_2O_3$ molar ratio of 1.27 is introduced at a flow rate of 690 g of solution/min via a second introduction cannula close to the stirring rotor, until a pH of 9.0 is reached. The introduction is then stopped. The aluminum concentration of the reaction mixture is then 2.10 wt % of alumina ($Al_2O_3$).

In step (b), the introduction of the aluminum sulfate solution is again started at a flow rate of 570 g of solution/min and the sodium aluminate solution is simultaneously introduced into the stirred reactor at a regulated flow rate so as to maintain the pH at a value of 9.0. This step lasts 45 minutes.

In step (c), the introduction of the aluminum sulfate solution is stopped and the addition of the sodium aluminate solution is continued at a flow rate of 320 g of solution/min until a pH of 9.5 is reached. The addition of the sodium aluminate solution is stopped.

In step (d), the reaction slurry is poured onto a vacuum filter. At the end of the filtration step, the cake is washed with deionized water at 65° C.

In step (e), the cake is redispersed in deionized water to obtain a suspension having a concentration close to 9 wt % of oxide ($Al_2O_3$). A nitric acid solution at a concentration of 69% by weight is added to the suspension so as to obtain a pH close to 6. The suspension is passed through an LME20 brand ball mill from the manufacturer Netzsch. The operating conditions of the mill are adjusted so as to obtain a D50 of 5 microns.

In step (f), a cerium nitrate solution is prepared at a concentration in the region of 29% by weight of oxide ($CeO_2$). This solution is added with stirring to the suspension obtained from step (e) so as to obtain a $CeO_2/(CeO_2+Al_2O_3)$ mass ratio of 20 wt %.

In step (g), the suspension obtained from step (f) is spray-dried to obtain a dried powder.

In step (h), the spray-dried powder is calcined in air at 940° C. for 2 hours (temperature increase rate of 3° C./min). The loss of mass observed during this calcination is 47% wt %.

Example 2: Preparation of a Composition of Aluminum Oxide and Cerium Oxide According to the Invention (80 wt % $Al_2O_3$-20 wt % $CeO_2$) According to Embodiment (a1) and with α=60%

157 kg of deionized water are introduced into a stirred reactor and heated to 85° C. This temperature is maintained throughout steps (a) to (c). An acid mixture consisting of 36.3 kg of aluminum sulfate solution with a concentration of 8.3 wt % of alumina ($Al_2O_3$) and 3.2 kg of cerium nitrate solution with a concentration of 29.0 wt % of ceria ($CeO_2$) is made up.

13.8 kg of the acid mixture are introduced at a flow rate of 920 g of solution/min via an introduction cannula close to the stirring rotor. At the end of the introduction, the pH in the reactor is close to 2.6 and the aluminum concentration is 0.62% by weight of alumina ($Al_2O_3$). The introduction of the acid mixture is then stopped.

step (a): a sodium aluminate solution with a concentration of 24.9 wt % of alumina ($Al_2O_3$) and a $Na_2O/Al_2O_3$, molar ratio of 1.27 is introduced at a flow rate of 690 g of solution/min via a second introduction cannula close to the stirring rotor, until a pH of 9.0 is reached. The introduction is then stopped.

In step (b), the introduction of the acid mixture is again started at a flow rate of 570 g of solution/min and the sodium aluminate solution is simultaneously introduced into the stirred reactor at a regulated flow rate so as to maintain the pH at a value of 9.0. This step lasts 45 minutes.

In step (c), the introduction of the acid mixture is stopped and the addition of the sodium aluminate solution is continued at a flow rate of 320 g of solution/min until a pH of 9.5 is reached. The addition of the sodium aluminate solution is stopped.

In step (d), the reaction slurry is poured onto a vacuum filter. At the end of the filtration step, the cake is washed with deionized water at 65° C.

In step (e), the cake is redispersed in deionized water to obtain a suspension having a concentration close to 9 wt % of oxide ($Al_2O_3$). A nitric acid solution at a concentration of 69% by weight is added to the suspension so as to obtain a pH close to 6. The suspension is passed through an LME20 brand ball mill from the manufacturer Netzsch. The operating conditions of the mill are adjusted so as to obtain a D50 of 5.1 microns.

In step (f), a cerium nitrate solution is prepared at a concentration of 29% by weight of oxide ($CeO_2$). This solution is added with stirring to the suspension obtained from step (e) so as to obtain a $CeO_2/(CeO_2+Al_2O_3)$ mass ratio of 20 wt %.

In step (g), the suspension obtained from step (f) is spray-dried to obtain a dried powder.

In step (h), the spray-dried powder is calcined in air at 940° C. for 2 hours (temperature increase rate of 3° C./min).

Comparative Example 3: Preparation of a Composition of Aluminum Oxide and Cerium Oxide Containing 20% of Cerium Oxide (80% $Al_2O_3$-20% $CeO_2$) and with α=0%

157 kg of deionized water are introduced into a stirred reactor and heated to 85° C. This temperature is maintained throughout steps (a) to (c). An acid mixture consisting of 31.6 kg of aluminum sulfate solution with a concentration of 8.3 wt % of alumina ($Al_2O_3$) and 7.9 kg of cerium nitrate solution with a concentration of 29.0 wt % of ceria ($CeO_2$) is made up.

13.8 kg of the acid mixture are introduced at a flow rate of 920 g of solution/min via an introduction cannula close to the stirring rotor. At the end of the introduction, the pH in the reactor is close to 2.7 and the aluminum concentration is 0.54% by weight of alumina ($Al_2O_3$). The introduction of the acid mixture is then stopped.

step (a): a sodium aluminate solution with a concentration of 24.9 wt % of alumina ($Al_2O_3$) and a $Na_2O/Al_2O_3$ molar ratio of 1.27 is introduced at a flow rate of 690 g of solution/min via a second introduction cannula close to the stirring rotor, until a pH of 9.0 is reached. The introduction is then stopped. The aluminum concentration of the reaction mixture is then 1.60 wt % of alumina ($Al_2O_3$).

In step (b), the introduction of the acid mixture is again started at a flow rate of 570 g of solution/min and the sodium aluminate solution is simultaneously introduced into the stirred reactor at a regulated flow rate so as to maintain the pH at a value of 9.0. This step lasts 45 minutes.

In step (c), the introduction of the acid mixture is stopped and the addition of the sodium aluminate solution is continued at a flow rate of 320 g of solution/min until a pH of 9.5 is reached. The addition of the sodium aluminate solution is stopped.

In step (d), the reaction slurry is poured onto a vacuum filter. At the end of the filtration step, the cake is washed with deionized water at 65° C.

In step (e), the cake is redispersed in deionized water to obtain a suspension having a concentration close to 9 wt % of oxide ($Al_2O_3$). A nitric acid solution at a concentration of 69% by weight is added to the suspension so as to obtain a pH close to 6. The suspension is passed through an LME20 brand ball mill from the manufacturer Netzsch. The operating conditions of the mill are adjusted so as to obtain a D50 of 5.4 microns.

In next step, the suspension obtained from step (e) is spray-dried to obtain a dried powder.

In next step, the spray-dried powder is calcined in air at 940° C. for 2 hours (temperature increase rate of 3° C./min). The loss of mass observed during this calcination is 46.3 wt %.

TABLE I

| Ex. | | BET ($m^2$/g) | porous volumes (Hg porosimetry) (mL/g) | $D_{900° C.-2h}$ (nm) $D_{1100° C.-5h}$ (nm) by XRD | ΔD (nm) by XRD | bulk density (g/$cm^3$) |
|---|---|---|---|---|---|---|
| 1 | 80% $Al_2O_3$ − 20% $CeO_2$ α = 100% | fresh: 129 1100° C./5 h: 50 | $PV_{5-100}$ = 0.46 $PV_{100-1000}$ = 0.03 TPV = 1.05 | 11 34 | 23 | 0.62 |
| 2 | 80% $Al_2O_3$ − 20% $CeO_2$ α = 60% | fresh: 141 1100° C./5 h: 53 | $PV_{5-100}$ = 0.49 $PV_{100-1000}$ = 0.03 TPV = 1.06 | 14 38 | 24 | 0.54 |
| Cex 3 | 80% $Al_2O_3$ − 20% $CeO_2$ α = 0% | fresh: 158 1100° C./5 h: 59 | $PV_{5-100}$ = 0.56 $PV_{100-1000}$ = 0.02 TPV = 1.11 | 28 49 | 21 | 0.48 |

TABLE II

| Ex. | D10 (μm) | D50 (μm) | D90 (μm) | $Na_2O$ (ppm) | $SO_4$ (ppm) |
|---|---|---|---|---|---|
| 1 | 0.9 | 10.2 | 24.6 | 410 | 690 |
| 2 | 1.3 | 14.1 | 30.1 | 360 | 940 |
| Cex3 | 1.5 | 14.6 | 32.3 | 160 | 7550 |

As is visible, the process of the invention makes it possible to obtain a composition with a low crystallite size at 900° C. and 1100° C.

The invention claimed is:

1. A composition:

based on Al and Ce in a form of oxides (composition C1); or based on Al, Ce and La in a form of oxides (composition C2), with proportions as follows:

a proportion of $CeO_2$ is between 3.0 wt % and 35.0 wt %;

a proportion of $La_2O_3$ (for composition C2 only) is between 0.1 wt % and 6.0 wt %;

a remainder as $Al_2O_3$;

wherein the composition exhibits a porosity profile as follows:

a pore volume in a range of pores with a size of between 5 nm and 100 nm which is between 0.35 and 1.00 mL/g; and a pore volume in a range of pores with a size of between 100 nm and 1000 nm which is less than or equal to 0.15 mL/g, wherein these pore volumes are determined by a mercury porosimetry technique;

wherein the composition is further characterized by:

a mean size of crystallites after calcination in air at 1100° C. for 5 hours (denoted $D_{1100° C.-5h}$) which is lower than 45.0 nm;

a mean size of crystallites after calcination in air at 900° C. for 2 hours (denoted $D_{900° C.-2h}$) which is lower than 25.0 nm; and an increase ΔD of the mean size of the crystallites lower than 30.0 nm, wherein ΔD is calculated using formula:

$\Delta D = D_{1100^\circ\ C.-5h} - D_{900^\circ\ C.-2h}$;

wherein the mean size of the crystallites is obtained by X-ray diffraction (XRD) from a diffraction peak [111] of a cubic phase corresponding to cerium oxide, present at 2θ between 28.0° and 30.0°.

2. The composition according to claim 1 consisting of oxides of Ce and Al (composition C1) or consisting of oxides of Ce, Al and La (composition C2).

3. The composition according to claim 1, wherein the proportion of $Al_2O_3$ is:

between 65.0 wt % and 97.0 wt % for composition C1;

between 59.0 wt % and 96.9 wt % for composition C2.

4. The composition according to claim 1 comprising a crystalline phase based on alumina.

5. The composition according to claim 1 comprising a crystalline phase based on cerium oxide.

6. The composition according to claim 5 wherein the crystalline phase based on cerium oxide corresponds to pure $CeO_2$ or to $CeO_2$ containing lanthanum.

7. The composition according to claim 1 exhibiting a BET specific surface area of between 80 and 300 $m^2/g$.

8. The composition according to claim 1 exhibiting a BET specific surface area after calcining in air at 1100° C. for 5 hours higher than 40 $m^2/g$.

9. The composition according to claim 1 exhibiting a BET specific surface area after calcining in air at 1100° C. for 5 hours which is strictly lower than $82.35 \times (Al_2O_3) + 11.157$ $m^2/g$ wherein $(Al_2O_3)$ corresponds to the proportion of $Al_2O_3$ in wt % in the composition.

10. The composition according to claim 1 exhibiting a BET specific surface area after calcining in air at 1200° C. for 5 hours of between 25 and 60 $m^2/g$.

11. The composition according to claim 1 exhibiting a total pore volume which is greater than 0.70 mL/g, the total pore volume being determined by the mercury porosimetry technique.

12. The composition according to claim 1 exhibiting a total pore volume which is no more than 2.50 mL/g, the total pore volume being determined by the mercury porosimetry technique.

13. The composition according to claim 1 exhibiting a bulk density of between 0.35 $g/cm^3$ and 0.90 $g/cm^3$.

14. The composition according to claim 1 exhibiting:

a D50 between 2.0 and 15.0 μm;

a bulk density between 0.35 and 0.55 $g/cm^3$.

15. The composition according to claim 14, wherein the composition has a D90 between 20.0 μm and 60.0 μm.

16. The composition according to claim 1 exhibiting:

a D50 between 15.0 and 80.0 μm;

a bulk density between 0.40 and 0.90 $g/cm^3$.

17. The composition according to claim 16, wherein the composition has a D90 between 40.0 μm and 150.0 μm.

18. The composition according to claim 1, having a sodium content of less than or equal to 0.50% by weight, this sodium content being expressed as weight of $Na_2O$ relative to a total weight of the composition.

19. The composition according to claim 1, having a sodium content of greater than or equal to 50 ppm, this sodium content being expressed as weight of $Na_2O$ relative to a total weight of the composition.

20. The composition according to claim 1, having a sulfate content of less than or equal to 1.00% by weight, this sulfate content being expressed as weight of $SO_4$ relative to a total weight of the composition.

21. The composition according to claim 1, having a sulfate content of greater than or equal to 50 ppm, this sulfate content being expressed as weight of $SO_4$ relative to a total weight of the composition.

22. A catalytic composition comprising:

(i) the composition according to claim 1; and (ii) optionally at least one inorganic material other than the composition; and/or (iii) optionally at least one platinum group metal (PGM).

23. The catalytic composition according to claim 22 wherein the inorganic material (ii) is selected from the group consisting of zeolites; alumina-based materials; ceria-based materials; zirconia-based materials; mixed oxides comprising oxides of cerium and zirconium; mixed oxides comprising oxides of aluminium, cerium and zirconium; and combinations thereof.

24. The catalytic composition according to claim 22 wherein the at least one PGM is selected from the group consisting of Pt, Pd, Rh and combinations thereof.

25. The catalytic composition according to claim 22 further comprising at least one element selected from the group consisting of alkali metals and alkaline earth metals.

26. A process for preparing the composition according to claim 1, the process comprising:

(a) introducing with stirring into a tank initially containing an acidic aqueous solution with a pH of between 0.5 and 4.0:

(a1)—either an aqueous solution of sodium aluminate until a pH of a reaction mixture of between 8.0 and 10.0, is obtained;

(a2)—or, simultaneously, (i) an aqueous solution of aluminum sulfate and (ii) an aqueous solution of sodium aluminate until a pH of the reaction mixture of between 6.5 and 10.0, is obtained;

so that, on conclusion of step (a), the aluminum concentration of the reaction mixture is between 0.50% and 3.0% by weight;

(b) simultaneously introducing an aqueous solution of aluminum sulfate and an aqueous solution of sodium aluminate, wherein rates of introduction of which are such that a mean pH of the reaction mixture is maintained within the pH range targeted in step (a);

wherein a temperature of the reaction mixture for steps (a) and (b) is at least 60° C.;

(c) optionally adjusting at the end of step (b), the pH of the reaction mixture to a value of between 7.5 and 10.5;

(d) filtering the reaction mixture and washing a solid recovered;

(e) reducing a particle size of a dispersion in water of the solid recovered on conclusion of step (d) by applying a mechanical or ultrasonication treatment;

(f) adding at least one salt of cerium to a dispersion obtained on conclusion of step (e);

(g) drying a dispersion obtained on conclusion of step (f) to obtain a solid; and (h) calcinating the solid obtained from step (g) in air, wherein:

for the compositions C1 and C2, at least one salt of cerium is added in step (f) and before step (d), a proportion α of the salt of cerium added in step (f) being between 20% and 100%, wherein α is calculated by formula: α=amount added in step (f)/total amount of cerium added×100; and for the composition C2, at least one salt of lanthanum is added before step (f).

27. The process according to claim 26 wherein the proportion $\alpha$=100%.

* * * * *